US007275498B2

(12) United States Patent
Martin et al.

(10) Patent No.: US 7,275,498 B2
(45) Date of Patent: Oct. 2, 2007

(54) FLOWABLE SOLIDS DISPENSING APPARATUS AND METHOD OF USE

(75) Inventors: Jeffrey Wes Martin, Jackson, TN (US); Mark Joseph Fiteny, Menlo Park, CA (US)

(73) Assignee: The Proctor 'Gamble Company, Cincinnati, OH (US)

( * ) Notice: Subject to any disclaimer, the term of this patent is extended or adjusted under 35 U.S.C. 154(b) by 2 days.

(21) Appl. No.: 10/305,807

(22) Filed: Nov. 27, 2002

(65) Prior Publication Data

US 2003/0113420 A1 Jun. 19, 2003

Related U.S. Application Data

(60) Provisional application No. 60/338,275, filed on Dec. 6, 2001.

(51) Int. Cl.
 *B05C 19/06* (2006.01)
(52) U.S. Cl. ............... 118/13; 118/22; 118/308; 222/199; 222/200; 222/185.1; 99/494
(58) Field of Classification Search ............ 118/13, 118/22, 57, 308; 426/289, 295; 222/196, 222/199, 200, 185.1; 99/494; 221/200, 221/92, 133; 209/397
See application file for complete search history.

(56) References Cited

U.S. PATENT DOCUMENTS

| 1,449,553 | A | * | 3/1923 | Schlunke | 209/264 |
|---|---|---|---|---|---|
| 1,749,925 | A | * | 3/1930 | Schaefer | 241/76 |
| 2,617,137 | A | * | 11/1952 | Bodnar | 15/308 |
| 3,194,397 | A | * | 7/1965 | Taege | 209/394 |
| 3,283,740 | A | * | 11/1966 | Fredricksen | 118/24 |
| 3,519,432 | A |  | 7/1970 | Succo et al. | |
| 3,520,248 | A |  | 7/1970 | MacKendrick | |
| 3,576,647 | A |  | 4/1971 | Liepa | |
| 3,594,187 | A |  | 7/1971 | Liepa | |
| 3,606,099 | A |  | 9/1971 | Benson | |
| 3,608,474 | A |  | 9/1971 | Liepa | |
| 3,609,939 | A |  | 10/1971 | Hooper et al. | |
| 3,626,466 | A |  | 12/1971 | Liepa | |
| 3,677,391 | A |  | 7/1972 | Schaelfer | |
| 3,752,676 | A |  | 8/1973 | Callaham | |
| 3,956,517 | A |  | 5/1976 | Curry et al. | |
| 4,333,415 | A | * | 6/1982 | Miller et al. | 118/16 |
| 4,676,074 | A | * | 6/1987 | Morgan et al. | 62/277 |
| 4,876,008 | A | * | 10/1989 | Tikkanen | 210/498 |
| 5,464,643 | A |  | 11/1995 | Lodge | |
| 5,846,324 | A |  | 12/1998 | Marshall et al. | |
| 5,951,760 | A | * | 9/1999 | Kuenen | 118/13 |
| 6,145,708 | A |  | 11/2000 | Schmidt | |
| 6,591,777 | B2 | * | 7/2003 | Cameron | 118/13 |
| 2002/0114871 | A1 |  | 8/2002 | Graham et al. | |

FOREIGN PATENT DOCUMENTS

JP          59135863          8/1984

* cited by examiner

*Primary Examiner*—Laura Edwards
(74) *Attorney, Agent, or Firm*—S. Robert Chuey; Carl J. Roof; Peter D. Meyer (57) ABSTRACT

An apparatus and method for depositing flowable solids onto articles located on a moving conveyor. A flowable solid is placed on a vibrating trough and dispensed to an article on the moving conveyor through a slot in the trough. A third planar surface placed beneath the slot receives the flowable solid from the slot and provides an even dispersing pattern of the flowable solid onto the articles.

9 Claims, 7 Drawing Sheets

FLOWABLE SOLIDS DISPENSING APPARATUS AND METHOD OF USE

CROSS-REFERENCE TO RELATED APPLICATION

This application claims the benefit of U.S. Provisional Application No. 60/338,275, filed Dec. 6, 2001.

FIELD OF THE INVENTION

The present invention relates to an apparatus and method for depositing flowable solids onto articles on a moving conveyor. More particularly, this invention relates to an apparatus for depositing flowable solid flavor crystals, salts, or seasonings onto oven cooked, fried, and/or raw food products.

BACKGROUND OF THE INVENTION

Snack foods, particularly savory snacks, are extremely popular with consumers. Such snack foods include but are not limited to potato chips, nachos, tortilla chips, corn chips, other extruded snacks, and the like. Such snack foods are typically flavored, or seasoned, with a flowable solid, such as spices and/or seasonings ("seasonings") by sprinkling the seasonings on the surface of the individual snack items. Examples include potato chips seasoned with salt, barbecue flavoring, sour cream and onion flavoring, vinegar flavoring, etc. Similarly, corn chips and other snack foods are seasoned with various flavorings. The distribution of seasoning is accomplished by sprinkling seasoning on the surface of the products after the products have been cooked and prior to their packaging. The application and distribution of such seasoning greatly affects the product quality. That is, if seasoning is distributed in clumps some chips can be too strongly seasoned while other portions of the same batch of chips, or even portions of the same chip, can be too lightly seasoned, creating a poor quality product. Also, quite importantly, the distribution of seasoning greatly affects the economy of manufacturing. There is a continuing desire to economically measure and uniformly and evenly distribute the seasoning over the snack food during the manufacturing process.

Almost all seasonings vary in their flow properties. The metering of seasonings ensures that a proper amount is applied. Distribution of a seasoning on a product is important to ensure that the seasonings are evenly distributed over the product. Common seasonings in favor with consumers of snack food products can include, for example, barbecue, sour cream and onion, cheese, are sticky, lumpy, and very difficult to dispense. Generally, most seasonings present problems in distribution, not only the above-mentioned seasonings.

Typically, the seasonings are applied with the use of a "flavoring drum" which is a barrel-like container that rotates about an axis that is tilted relative to a horizontal axis. The snack food product to be coated is fed into an elevated open end of the flavoring drum by a speed controlled weigh conveyor. A seasoning feeder, extending horizontally into the drum produces a discharge of seasoning that is applied to the surface of the product located in the drum. As the flavoring drum rotates, the product rotates and is coated as the product mixes with the seasoning within the flavoring drum. Gravity then causes the product to pass to an open discharge end of the flavoring drum and collected on a take-away conveyor.

However, the flavoring drum application method is problematic. The seasoning is typically hygroscopic and tends to agglomerate and plug-up or bridge openings in any associated drum nozzles or slots within the flavoring drum. This can require extensive down time with clean up and sanitation operations to ensure operation of the apparatus. Further, if the product is too dry, the seasoning will not typically adhere to the product surface. If the product is too moist, there can typically be an excess accumulation of seasoning on only portions of the product or in well-defined, discrete regions of the product. Therefore, a device that promotes a consistent, even distribution of a seasoning onto the surface of a product can be highly advantageous.

Another process for the application of seasoning to a product involves the use of a screw conveyor feed system. The typical system includes a screw feeder generally positioned near the center-line and extending into a discharge end of a flavoring drum or a screw feeder positioned above a product passing underneath by conveyor. Seasoning placed in a hopper immediately above the screw feeder flows by gravity into the feed inlet. As the screw feeder turns, the seasoning is enclosed between screw flights and forced along the bottom of the feeder through fine slots or nozzles in order to sprinkle the seasoning on the food product as the food product rotates within the flavoring drum.

However, the screw conveyor system is inefficient and difficult to clean and maintain. The action of the screw feeder packs the seasoning during operations, causing seasoning build-up within the screw feeder and external to the screw feeder housing. Thus, frequent cleaning is required. Additionally, screw feeders can be problematic in that they can add shear stresses to the conveyed seasoning, potentially altering the physical properties of the seasoning. Further, all seasoning build-up is a waste of seasoning that significantly increases the costs associated with processing due to product losses, clean-up and processing down-time.

Other processes can also be used to apply a seasoning to a snack product and are used in the industry. This includes, but is not limited to, belt coaters, roll coaters, brush coaters, blade coaters, electrostatic coaters, and air impingement coaters. All of these methods produce generally unsatisfactory results and have similar high maintenance requirements to maintain an efficient and high throughput.

Examples of flavoring drum applicators are disclosed in U.S. Pat. Nos. 3,606,099; 4,513,918; 4,715,315; 4,755,390; 4,760,778; 5,090,593; 5,386,939; 5,964,146; and 6,113,960. Examples of screw conveyor feed systems are disclosed in U.S. Pat. Nos. 4,493,442; 4,614,162; 4,907,720; 5,287,801; 5,386,939; and 5,846,324. Other coating methods, including belt coaters, roll coaters, brush coaters, blade coaters, electrostatic coaters, and air impingement coaters are disclosed in U.S. Pat. Nos. 3,693,840; 4,936,489; 5,139,801; 5,150,798; 5,353,959; 5,385,086; 5,707,448; 5,855,671; 5,957,332; 6,054,154; and 6,145,708.

SUMMARY OF THE INVENTION

In one aspect, the invention relates to a flowable solids dispensing apparatus comprising a first surface and a second surface disposed about an axis. The second surface is disposed below the first surface. The first surface and said second surface form a slot therebetween and an angle therebetween. A flowable solid can then progress from the first surface to the second surface through the slot.

In another aspect, the invention relates to a flowable solids dispensing apparatus comprising A flowable solids dispensing apparatus comprising a first surface and at least two second surfaces disposed about the axis. Both of the at least two second surfaces are disposed below the first surface. The first surface and both of the second surfaces form at least one slot therebetween. Further, the first and second surfaces form an angle therebetween. A flowable solid can then progress from the first surface to at least one of the second surfaces through the at least one slot.

Another aspect of the present invention provides a method of applying a flowable solid to a substrate. First, a first surface disposed about an axis is supplied. Next, a second surface is supplied that is disposed beneath the first surface and forms an angle therebetween. The surface and the second surfaces form a slot therebetween. Third, a substrate is disposed upon a conveyor proximate to the second surface. The conveyor has an axis substantially parallel to the axis of the first and second surface. Fourth, a flowable solid is supplied to the first surface. The first surface is then vibrated with a vibrator so that the vibrator progresses the flowable solid substantially along the first surface. Next, the flowable solid is substantially disposed from the slot disposed on the first surface to the second surface. The flowable solid is then substantially dispensed from the second surface to the substrate.

DETAILED DESCRIPTION

The present invention is generally related to a flowable solids dispensing apparatus that has a first surface and a second surface disposed about a central axis. The first surface and the second surface are generally disposed about the central axis to form an angle therein. The second surface is generally disposed below the first surface and forms a slot with the first surface so that a flowable solid material will progress from the first surface to the second surface through the slot. The purpose for progressing a flowable solid material from a first surface to a second surface is not limited to, but includes, the ability to provide an even distribution of a flowable solid onto a product positioned beneath the flowable solids dispensing apparatus. Providing an even distribution of a flowable solid material, such as a seasoning, to a snack food product can provide a snack food product that is more evenly coated, and thereby more evenly seasoned, thus providing a more consistently coated and/or flavored snack food. A more consistently flavored snack food can provide the snack food consumer with a more flavorful and enjoyable snack food consumption experience.

Figure 1:
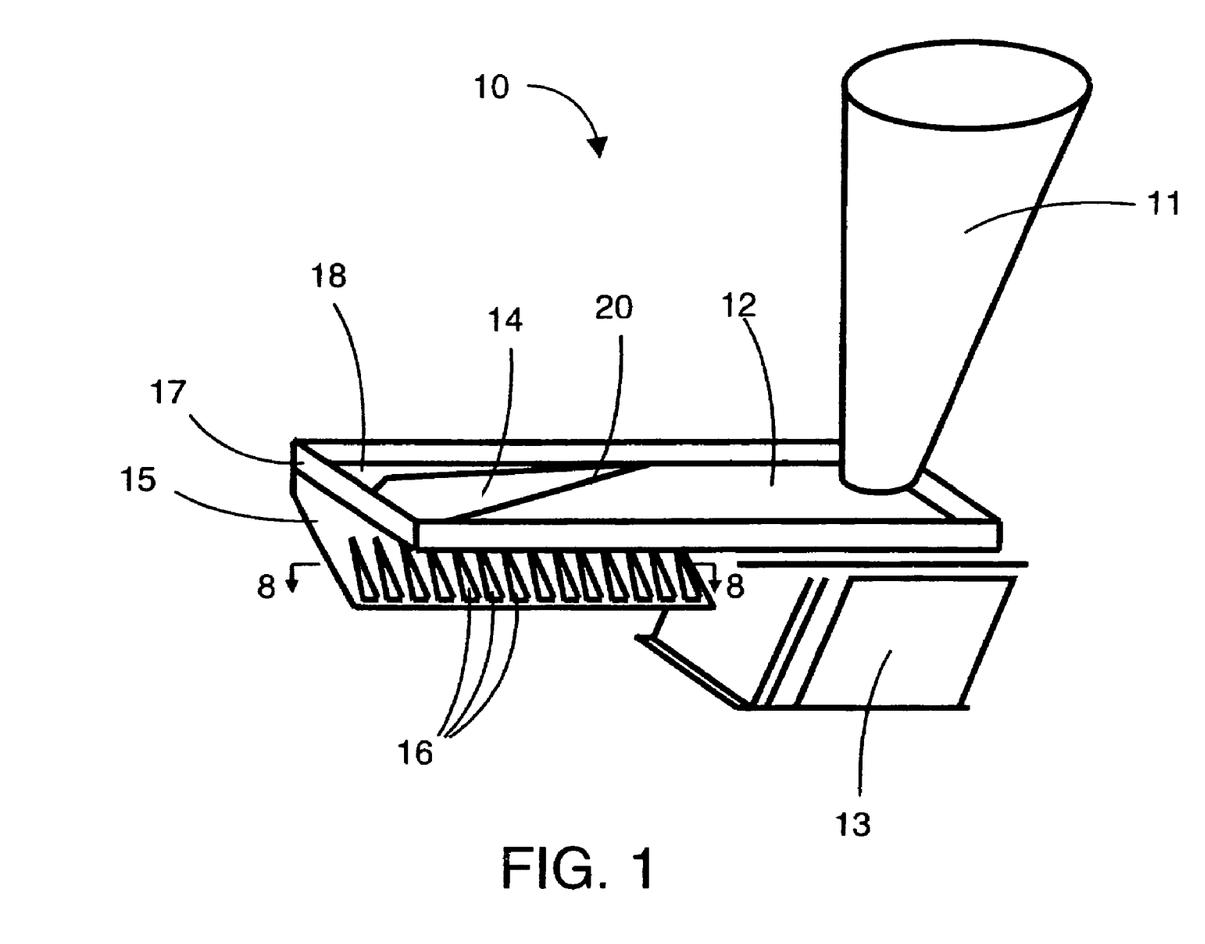
FIG. 1 is a perspective view of a flowable solids dispensing apparatus in accordance with the present invention.
Figure 2:
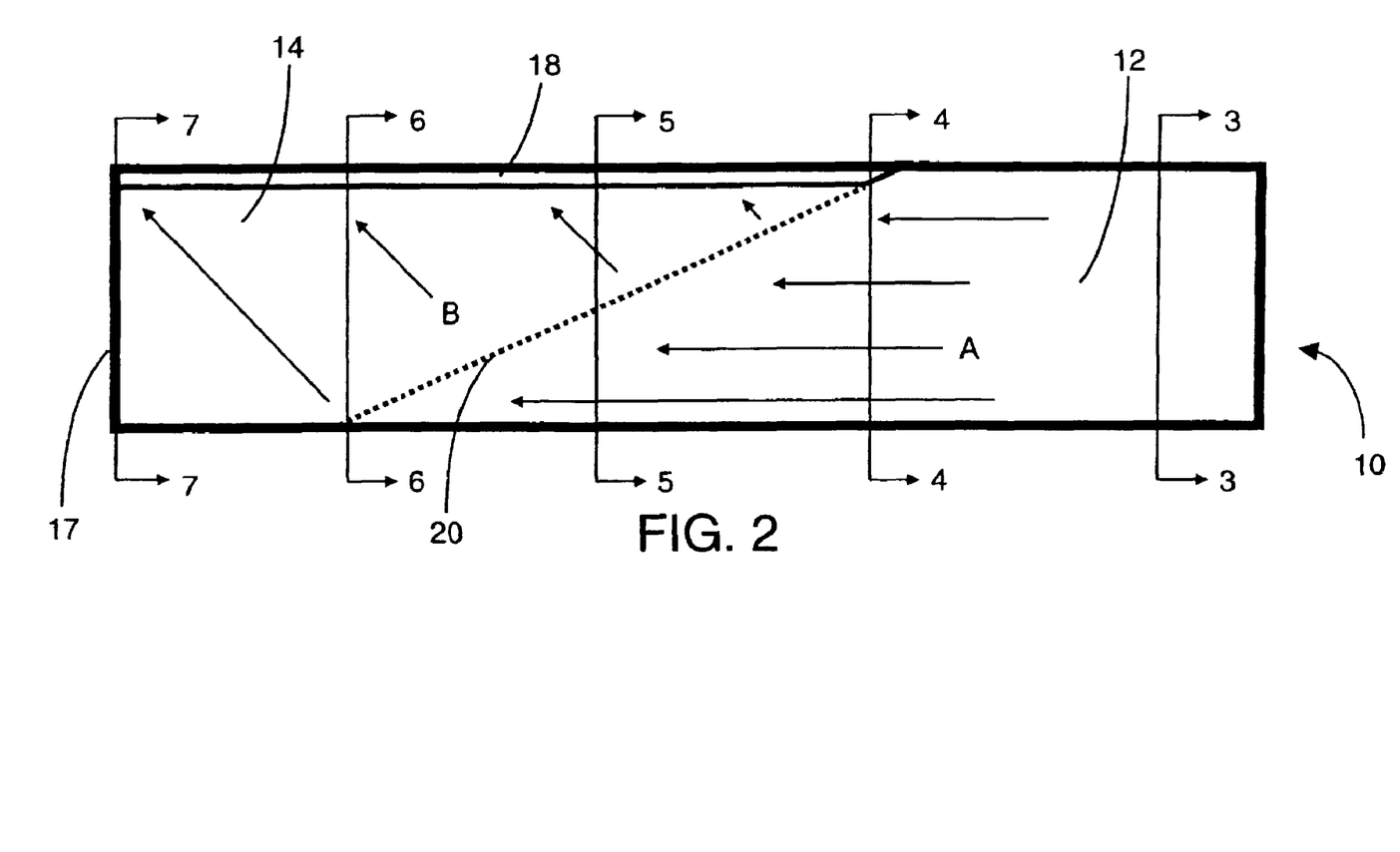
FIG. 2 is a top elevational view of the flowable solids dispensing apparatus with the feed hopper removed.
Figure 3:
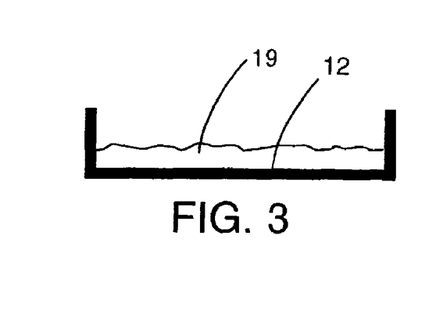
FIG. 3 is a cross-sectional view of the apparatus of FIG. 2 taken along the line 3-3.
Figure 4:
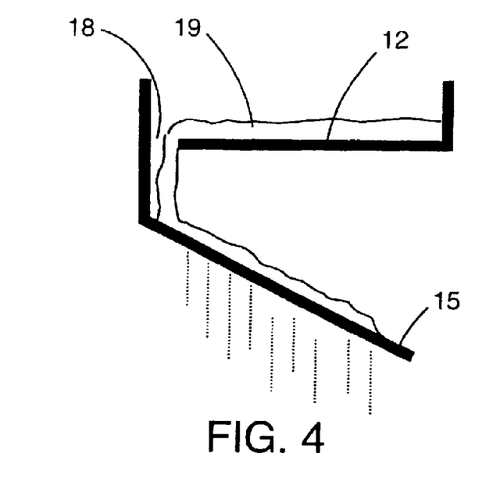
FIG. 4 is a cross-sectional view of the apparatus of FIG. 2 taken along the line 4-4.
Figure 5:
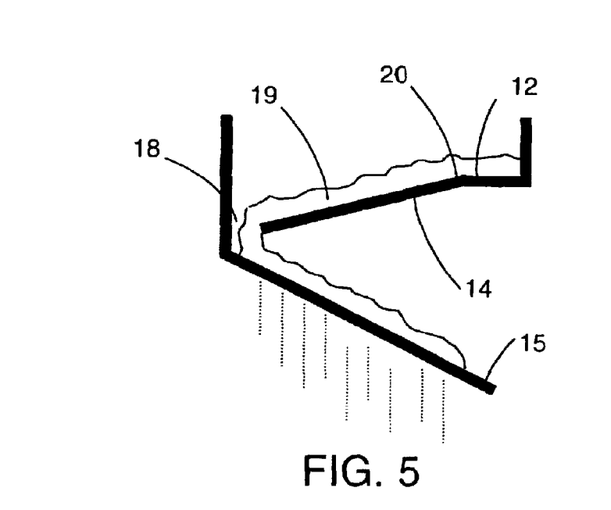
FIG. 5 is a cross-sectional view of the apparatus of FIG. 2 taken along the line 5-5.
Figure 6:
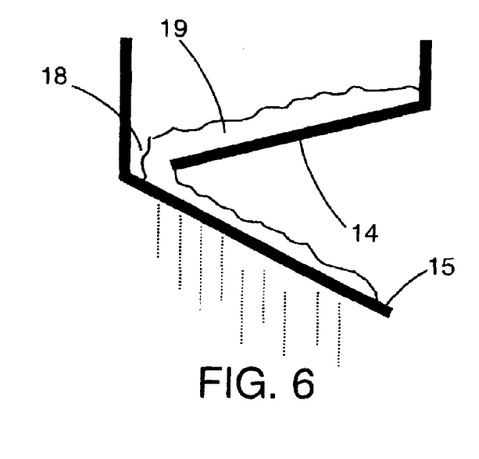
FIG. 6 is a cross-sectional view of the apparatus of FIG. 2 taken along the line 6-6.
Figure 7:
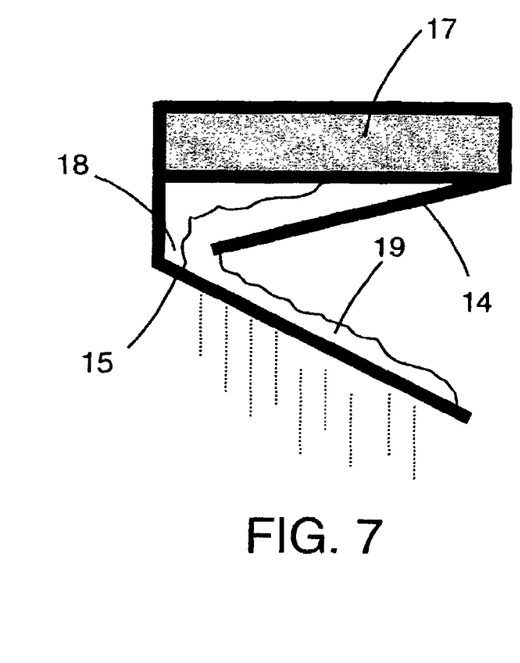
FIG. 7 is a cross-sectional view of the apparatus of FIG. 2 taken along the line 7-7.

Referring to FIGS. 1 and 2, an exemplary flowable solids dispensing apparatus 10 generally comprises a first surface 14 and a second surface 15. First surface 14 and second surface 15 are generally arranged about an axis. Preferably, surface 14 and surface 15 are parallel to the axis and surface 15 is disposed below surface 14 to form slot 18 so that a flowable sold material 19 can traverse surface 14, pass through slot 18 onto surface 15. The flowable solid material 19 can then traverse surface 15 and then be disposed upon an object passing or disposed thereunder upon leaving surface 15. Surface 14 and/or surface 15 can be provided as planar surfaces, substantially planar surfaces, inward or outward frustoconical surfaces, inward or outward substantially frustoconical surfaces, corrugated surfaces, inward or outward vortically-shaped surfaces, "V"-shaped surfaces, concave surfaces, convex surfaces, and combinations thereof. In any regard, it is preferred that surface 14 and surface 15 be selected in order to provide an efficacious and/or even distribution of a flowable solids material 19 upon an object passing under flowable solids dispensing apparatus 10.

Flowable solids dispensing apparatus 10 can optionally comprise trough 12 having a longitudinal axis and a generally planar shape. Trough 12 can be disposed above surface 14 or can be unibodily attached to surface 14. In any regard, if trough 12 is utilized with flowable solids dispensing apparatus 10, it is preferred that a flowable solids material 19 be capable of traversing trough 12 until contacting surface 14. Further, at least one optional oscillator or vibrator (vibrator) 13 can be attached to flowable solids dispensing apparatus 10 and/or trough 12. If trough 12 and surface 14 are present in a unibody form, vibrator 13 can oscillate or vibrate both trough 12 and surface 14. Further, if trough 12, surface 14, and surface 15 are provided in a unibody form, vibrator 13 can oscillate or vibrate all surfaces thereto attached. It is also believed that vibrator 13 can oscillate or vibrate one or more selected surface of flowable solids dispensing apparatus 10 if so desired. However, as would be known to one of skill in the art, any conveying methodology can be utilized that channels a flowable solid through a finger applicator.

Exemplary, but non-limiting flowable solids 19 including spices, seasonings, confections, sprinkles, nuts, powdered coatings, other topical coatings and/or additives, and the like, can be introduced to first surface 14 and/or trough 12 via hopper 11. However, it should be realized that it is possible to introduce any metered and/or unmetered flowable solids 19 by numerous methodologies to surface 14 and/or trough 12 that include, but are not limited to, conveyor belts, screw augers, blades, rotary valves, feeder rolls, chutes, vibratory trays, and combinations thereof. It is also preferred that flowable solids 19 be fed evenly across the dimension of first surface 14 and/or trough 12. However, one of skill in the art could also provide flowable solids 19 directly to surface 14 and/or trough 12 without the use of hopper 11.

As a non-limiting example, vibrator 13 can be attached to flowable solids dispensing apparatus 10 and/or trough 12 through a mounting bracket. In a preferred embodiment, trough 12 extends approximately the length of flowable solids dispensing apparatus 10 and terminates at wall 17. Wall 17 can be a device such as a weir, however, wall 17 should preferably retain flowable solid 19 within the confines of trough 12. Preferably, trough 12 is generally substantially planar, however, other non-limiting geometries can be used, such as "V"-shaped, "U"-shaped, and/or a corrugated shape. However, it should be realized that the geometry chosen should permit flowable solids 19, such as granules, to flow continuously and uniformly across the surface of trough 12. When the vibrator 13 is activated, the attachment of the vibrator 13 to surface 14 and/or trough 12 causes surface 14 and/or trough 12 to vibrate. Any vibrator 13 common in the industry can be used and the rate of vibration, and/or vibration amplitude can be varied by user controls on vibrator 13 or by any electronic controller directly on or remote to vibrator 13.

In the preferred embodiment of FIG. 1, hopper 11 is positioned relative to trough 12 so the outlet of hopper 11 aligns with trough 12. It is preferred that hopper 11 be isolated from the vibration of trough 12 so that hopper 11 and trough 12 do not directly contact each other. This can allow the flowable solids 19 contained within trough 12 to migrate toward wall 17 during vibration of trough 12 by vibrator 13. Additional flowable solids stored within or about hopper 11 can replenish flowable solids 19 used in processing.

As FIG. 2 shows, a flowable solid can be oscillated or vibrated in a direction generally parallel to the longitudinal axis of trough 12 toward break 20 in trough 12. In a preferred embodiment surface 14 and trough 12 generally define break 20. Surface 14 preferably extends away from trough 12 in a direction generally normal to the surface (the negative z-direction) and elongate axis of trough 12. It is preferred that trough 12 and surface 14 be generally substantially planar. To this end, it was surprisingly found that planar surfaces could promote an even flow of flowable solid 19. One of skill in the art will also realize that break 20 can extend entirely or partially across the entirety of trough 12.

As is further shown in FIGS. 4-7, slot 18 and break 20 generally define surface 14. The relative area of surface 14 generally increases as flowable solids 19 move in the direction A of the longitudinal axis of trough 12. It should be remembered that slot 18 should be at least slightly larger than the maximum diameter of flowable solid 19 in order to facilitate movement of flowable solid 19 through slot 18 to surface 15. Without desiring to be bound by theory, it is believed that dimensioning slot 18 to be smaller than the average diameter of flowable solid 19 could cause degradation of flow in flowable solid 19. As flowable solids approach break 20, the general direction of movement changes from direction A to direction B that can be generally parallel to surface 14. While the flowable solids 19 traverse surface 14, flowable solids 19 can still have movement in the direction of the elongate axis of trough 12. However, it is believed that flowable solids 19 will move in a direction substantially perpendicular to the elongate axis of trough 12 due to the normal force of gravity and the angle selected for surface 14. It should also be recognized that slot 18 can be completely or partially co-extensive along the length of surface 14.

It is also preferred that the angular displacement of surface 14 with respect to the horizon be uniformly maintained. It has been found that this angle should be maintained from about zero degrees from horizontal to about 90 degrees from horizontal. However, it has been preferably found that about a 40-degree angle from the horizon provides the best flow characteristics for generally most flowable solids 19. It is also possible that other multi-angular surfaces can be used to facilitate the movement of flowable solid 19 across surface 14.

As particularly shown in FIG. 2, the terminus of break 20 is selected so that remaining flowable solids 19 that reach surface 14 at the terminus of break 20 and a sidewall of trough 12 will contact surface 14. Without wishing to be bound by theory, it is believed that the location of the terminus of break 20 is believed to be dependent upon the physical and flow characteristics of flowable solid 19. It is also believed that the position of the terminus of break 20 is dependent on the amount of forward vibration needed to move flowable solid 19. Thus, the terminus of break 20 can be placed to facilitate movement of flowable solid 19 onto surface 14 properly. However, it is preferred that the placement of break 20 be related to both the angle of surface 14 and the type of flowable solid 19 to provide for flowable solid 19 to reach the end of slot 18 and not contact wall 17. Additionally, the distal end of surface 14 can be linear, curved, discontinuous, or have any shape or design. It was surprisingly found that forming the distal end of surface 14 in a triangular shape could provide increased flexibility when conveying or transporting materials having varying flowabilities. In any regard, it is preferred that the flowable solid 19 not contact wall 17.

Referring to FIGS. 2 and 4-7, after flowable solid 19 contacts and traverses surface 14, flowable solid 19 flows through slot 18 toward surface 15. Surface 15 is generally angled away from the plane of surface 14 and/or trough 12. Surface 15 can have an angle with respect to the horizon from about zero degrees to about 90 degrees. Further, surface 15 can form an angle with respect to surface 14, this angle preferably being an acute included angle. However, it was found that an angle of about 30 degrees with respect to the horizon produced generally the best flow characteristics for a generally wide array of flowable solids 19. Surface 15 is preferably generally planar, however one having skill in the art would be able to provide surface 15 in any shape, including those of surface 14, as described supra, including, but not limited to "C"-shaped, "U"-shaped, and/or triangular shaped.

Figure 8:
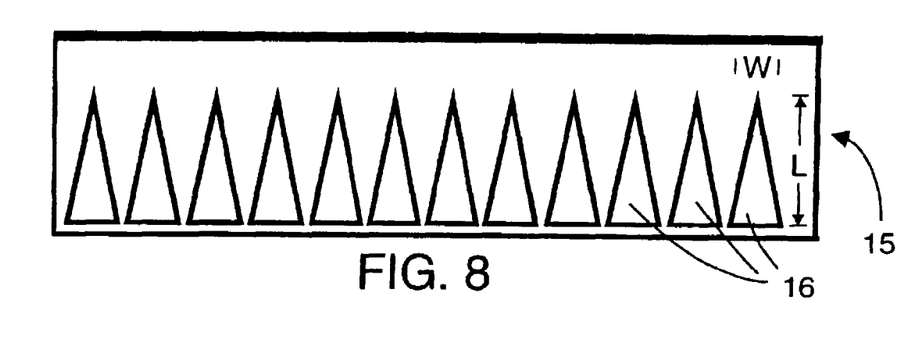
FIG. 8 is a cross-sectional view of the apparatus of FIG. 1 taken along the line 8-8.
Figure 9:
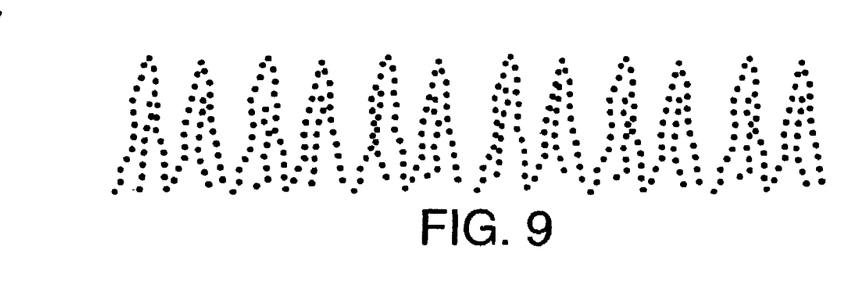
FIG. 9 is an exemplary granule dispersal pattern from use of the apparatus of FIG. 1; and, FIG. 10 is a perspective view of an alternative embodiment of a flowable solids dispensing apparatus.

As shown in FIG. 8, a portion of surface 15 has at least one opening 16 disposed thereon. The opening or openings 16 can have any dimension or shape. Exemplary and non-limiting opening 16 shapes include round, curvilinear, triangular, convex curved, concave curved, mesh, screen, and combinations thereof. It should be realized that openings 16 should be dimensioned to provide the most efficacious dispersal of flowable solid 19. As a non-limiting example, the use of a triangular, or serrated pattern, as shown in FIG. 8 can produce the general flowable solid 19 dispersal pattern as is shown in FIG. 9.

Without wishing to be bound by theory, as is shown in FIG. 8, it is believed that the dimension "W" should be determined by the average particle size of flowable solid 19. This can reduce clogging and facilitates the flow of large particles from surface 15. It is also believed that dimension "L" can determine the total width of dispersion achieved by flowable solid 19. Thus, it is believed that openings 16 should be dimensioned to have a ratio of "L" to "W" greater than one in order to provide for an efficacious deposition of a flowable solid onto an object positioned and/or passing thereunder.

The materials used to construct the flowable solids dispensing apparatus 10 can range from a wide variety of materials. In a preferred embodiment, flowable solids dispensing apparatus 10 is constructed from stainless steel or food-grade plastic. However, one of skill in the relevant art would be able to select a material that would be suitable for construction of the flowable solids dispensing apparatus 10. Further, the flowable solids dispensing apparatus 10 can have a surface coating applied thereto or inherently reside therein or thereon to provide flowable solids dispensing apparatus 10 with non-stick surface characteristics.

Referring again to FIGS. 2 and 8, while dimension "L" of opening 16 can provide flowable solid 19 distribution across the width of a product processing, or conveyance, line, the length of the slot 18 and surface 15 provide the length of distribution or the residence time for the flowable solids 19 in trough 12. It was surprisingly found that dispersing flowable solids 19 over the proper width (of the product) could provide total coverage of the surface of the product. Further, dispersing flowable solids 19, such as a seasoning, over an extended length can provide a longer residence time for the surface of the product and the applied flowable solid 19 to meet. Thus, it is believed that flowable solids 19 should completely impact a processing line passing proximate to surface 15 between the initiation and terminus of slot 18. Thus, the lengths of slot 18 and break 20 can be set by the required residence time needed for the application of the flowable solids 19 onto the product located proximate to surface 15. Without wishing to be bound by theory, it is believed that slot lengths from four to 12 inches, more preferably from about 8 inches to about 12 inches in length, provide the optimal residence time required for most flowable solids 19 for a typical snack food product. Typical products, or snack foods, believed suitable include, but are not limited to: potato chips, nacho chips, tortilla chips, corn chips, breads, cookies, cakes, pies, doughnuts, other extruded snacks, other baked snacks, other fried snacks, candies, other food items, and combinations thereof.

Additionally, trough 12 can be disposed to allow flowable solid 19 to impinge on a product in a drum feeder. As product traverses the length of the drum feeder, the product passes under flowable solids dispensing apparatus 10. Flowable solid 19 is dispersed from flowable solids dispensing apparatus 10, as discussed supra, and impinges the product as the product passes substantially parallel to trough 12. In this manner, it is possible for flowable solids dispensing apparatus 10 to impinge flowable solid 19 onto any number of sides of product.

Figure 1A:
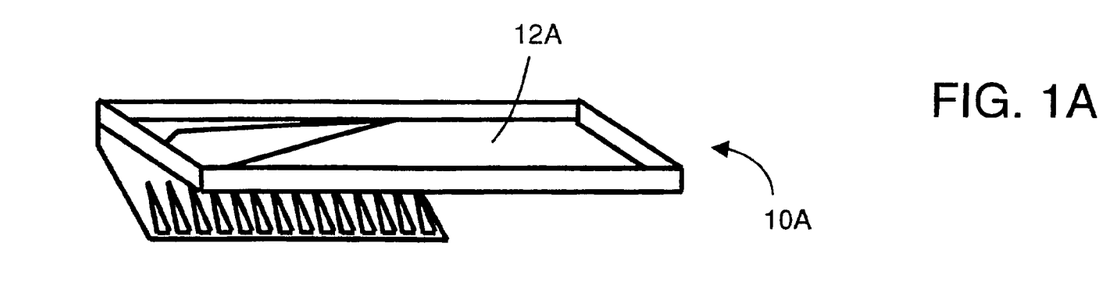
FIG. 1A is a perspective view of an alternative embodiment of a flowable solids dispensing apparatus.

Additional exemplary flowable solids dispensing embodiments are shown in FIGS. 1A, 1B, 1C, and 1D. In FIG. 1A, flowable solids dispensing apparatus 10A is shown without a flowable solids storage hopper. This can facilitate the supply of flowable solids 19 by a conveyor belt, screw auger, blade, rotary valve, feeder roll, chute, vibratory tray, and combinations thereof, or other device to dispensing apparatus 10A.

Figure 1B:
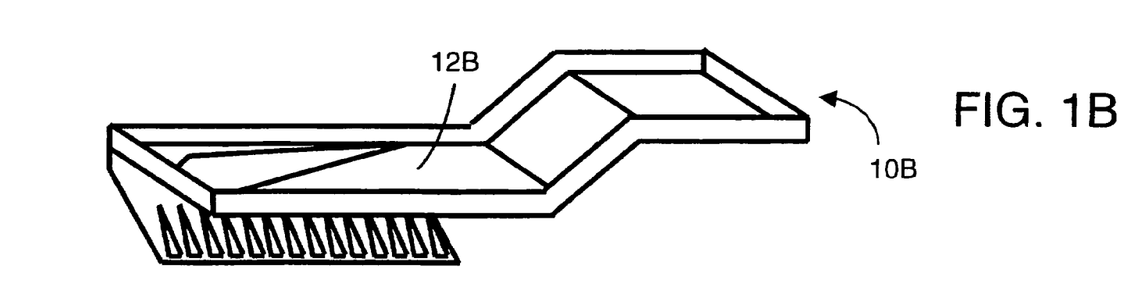
FIG. 1B is a perspective view of an alternative embodiment of a flowable solids dispensing apparatus.

FIG. 1B shows an alternative embodiment of flowable solids dispensing apparatus 10B. Trough 12B can have at least a portion of the trough extend vertically to allow for a region of acceleration for flowable solids 19 prior to contact with the first surface 14.

Figure 1C:
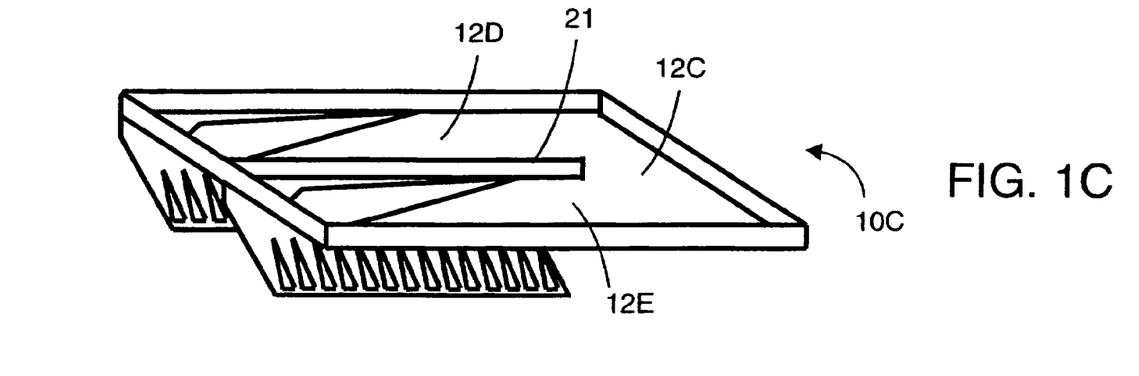
FIG. 1C is a perspective view of an alternative embodiment of a flowable solids dispensing apparatus.

FIG. 1C shows an alternative embodiment of flowable solids dispensing apparatus 10C. As shown, divider 21 has been placed on trough 12C to effectively divide trough 12C into at least two discrete flowable solids dispensing lines. Divider 21 can completely separate any number of troughs 12D, 12E, so that flowable solids 19 are confined to one trough. Optionally, divider 21 can only partially separate the trough to provide a common trough area 12C. While trough 12C is vibrating, flowable solids 19 can be placed in trough 12C and divided into two sub-troughs 12D, 12E through the vibratory process described supra. The divided flowable solids 19 are then dispensed onto a passing substrate in accordance with the disclosure supra. It is fully intended that flowable solids 19 can be divided into any number of lanes to suit the application. Further, divider 21 can have virtually any design. This includes simple geometric splits at the same point in the trough 12C, and staged splits where-a divider 21 splits flowable solids 19 flow into two lanes that can further subdivide downstream with additional dividers 21. Additionally, it is envisioned that dividers 21 can be adjustable to provide point-of-source flow to allow a specific flowable solid 19 to be concentrated in a particular trough, for example 12D or 12E. Further the adjustable dividers can be adjusted in situ if such a need would arise.

Figure 1D:
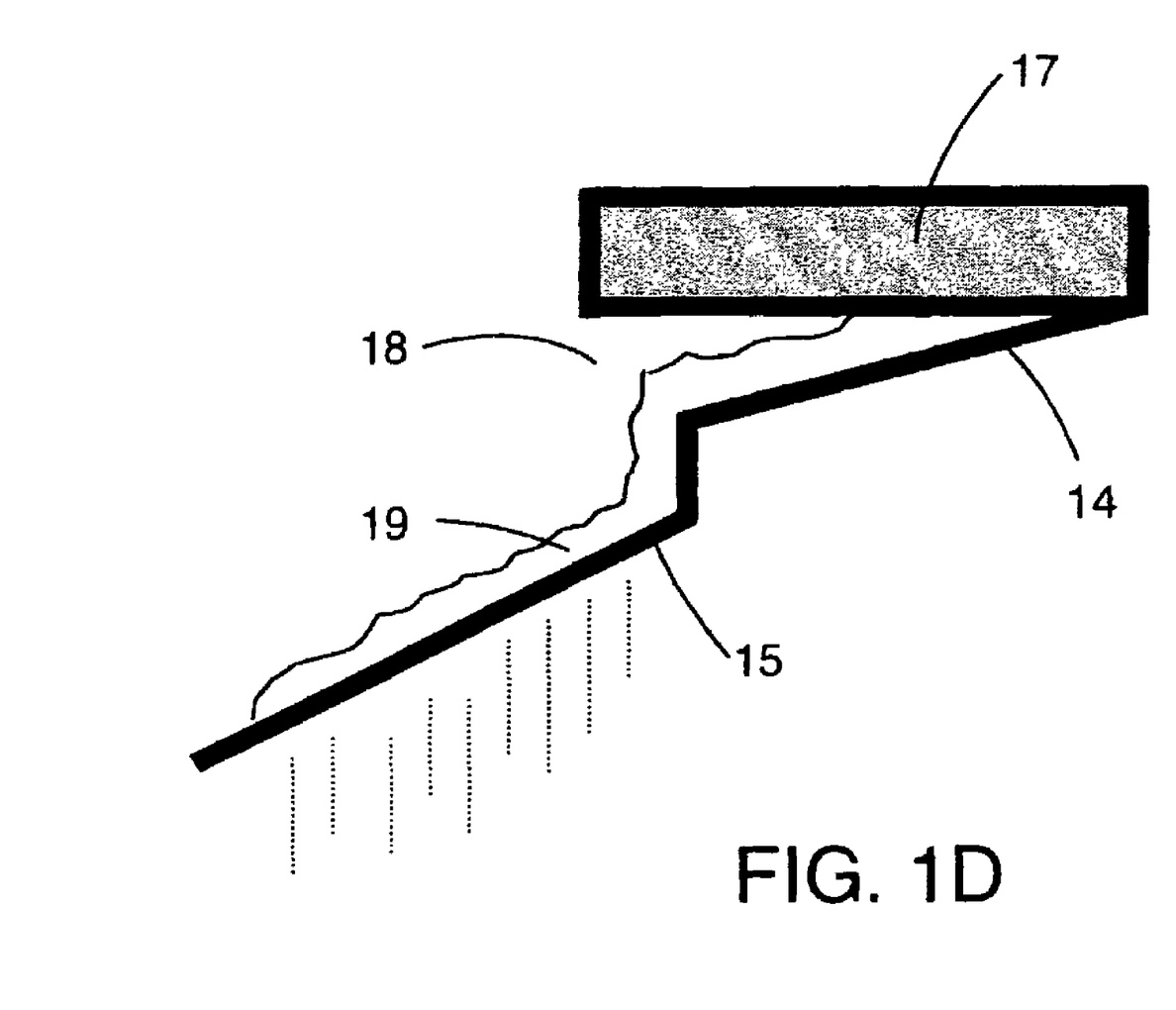
FIG. 1D is a cross-sectional view of an alternative embodiment of a flowable solids dispensing apparatus.

FIG. 1D discloses yet another embodiment in which surface 15 can be positioned so flowable solid 19 flows directly from surface 14 to surface 15. As shown, the flow direction of flowable solid 19 on surface 15 remains substantially parallel to the direction of flow of flowable solid 19 on surface 14. It is also believed that one of skill in the art would be able to fabricate either of surface 14 or surface 15 to encompass the benefits derived by combining both surface 14 and surface 15 into one surface without the need for an angular displacement between surface 14 and surface 15.

Figure 10:
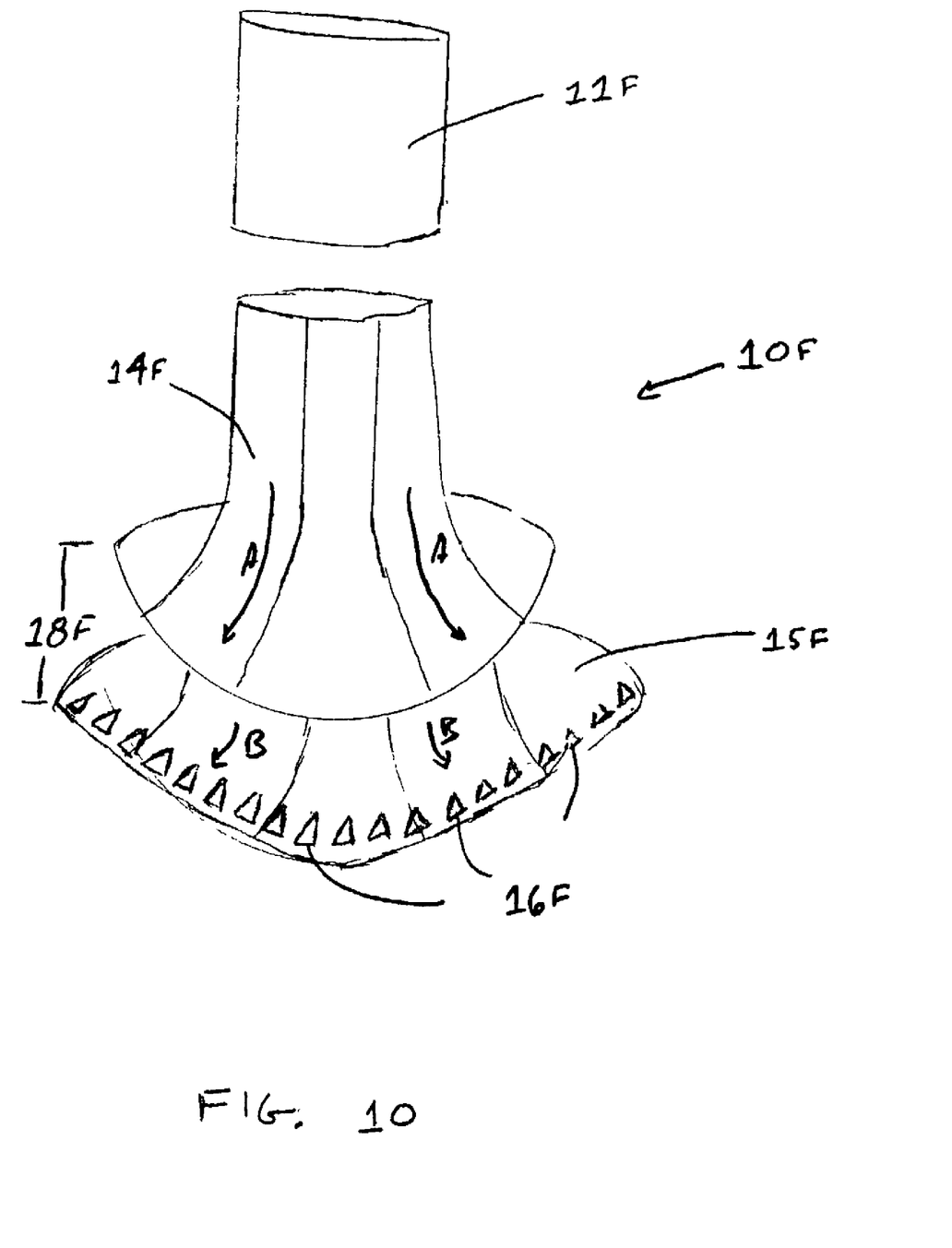

As shown in FIG. 10, an alternative flowable solids dispensing apparatus 10F is provided with a first surface 14F having an inverted substantially vortical shape and centered about an axis. In this regard, hopper 11F can provide a flowable solids material (not shown) in direction A of first surface 14F. As flowable solids material (not shown) traverses first surface 14F, flowable solids material (not shown) progresses along first surface 14F in direction B. When the flowable solid reaches the terminus of first surface 14F, the flowable solid (not shown) progresses across break 18F onto second surface 15F. The flowable solid material (not shown) then progresses along second surface 15F to opening 16F wherein the flowable solids material (not shown) then impinges a product positioned and/or passing thereunder. The flowable solids material (not shown) can be released from surface 15F through openings 16F onto a substrate disposed and/or passing thereunder.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A flowable solids dispensing apparatus comprising:
    a first surface disposed about an axis, the first surface being free of openings;
    a second surface disposed about said axis, said second surface being disposed below said first surface, said second surface having at least one opening disposed thereon and adapted for dispensing a flowable solid;
    a trough, said trough comprising a third surface substantially parallel to said axis, wherein the dispensing apparatus is operable for a flowable solid to progress from said third surface to said first surface;
    wherein said first surface and said second surface form a slot therebetween;

wherein said first surface and second surface form an angle therebetween;

wherein the at least one opening of said second surface has a length in a direction extending from the slot toward an edge of the second surface opposite the slot and a width in a direction extending perpendicular to the direction of the length;

wherein the dispensing apparatus is operable for a flowable solid to progress from said first surface to said second surface through said slot, said at least one opening of said second surface having a length to width ratio greater than one and wherein the at least one opening is triangular in shape; and wherein said third surface has at least one edge coextensive with said first surface.

2. The apparatus of claim 1 wherein said at least one edge is angularly disposed away from said axis.

3. The dispensing apparatus of claim 1 further comprising a receptacle for storing said flowable solid and dispensing said flowable solid upon said apparatus.

4. A flowable solids dispensing apparatus comprising:
(a) a first surface disposed about an axis, and
(b) at least two second surfaces disposed about said axis, both of said least two second surfaces being disposed below said first surface and each having at least one opening adapted for dispensing a flowable solid;

wherein said first surface and both of said second surfaces form at least one slot therebetween;

wherein said first surface and both of said second surfaces form an acute included angle therebetween;

wherein the at least one opening of each second surface has a length in a direction extending from the slot toward an edge of the second surface opposite the slot and a width in a direction extending perpendicular to the direction of the length; and;

wherein the dispensing apparatus is operable for a flowable solid to progress from said first surface to at least one of said second surfaces through said at least one slot, said openings having a length to width ratio greater than one and wherein the at least one slot is triangular in shape.

5. The apparatus of claim 4 further comprising;

at least one vibrator;

wherein said at least one vibrator is capable of vibrating said apparatus to progress a flowable solids material along said first surface.

6. The apparatus of claim 4 wherein said dispensing apparatus is operable for a flowable solid to progress from at least one of said second surfaces onto a food product disposed under said at least one of second surfaces.

7. The dispensing apparatus of claim 4 wherein each second surface has a plurality of openings disposed in the form of a row extending along the edge of each second surface opposite the slot.

8. The dispensing apparatus of claim 4 wherein each second surface has a plurality of openings disposed thereon and wherein the openings have a length in a direction extending from the slot toward an edge of the second surface opposite the slot and a width in a direction extending perpendicular to the direction of the length and the length to width ratio is greater than one.

9. The dispensing apparatus of claim 8 wherein the plurality of openings is disposed in the form of a row extending along the edge of each second surface opposite the slot.

* * * * *